(12) United States Patent
Lampkins et al.

(10) Patent No.: US 11,374,753 B2
(45) Date of Patent: Jun. 28, 2022

(54) SYSTEM AND METHOD FOR SELECTIVE TRANSPARENCY FOR PUBLIC LEDGERS

(71) Applicant: HRL Laboratories, LLC, Malibu, CA (US)

(72) Inventors: Joshua D. Lampkins, Gardena, CA (US); Hyun (Tiffany) J. Kim, Irvine, CA (US)

(73) Assignee: HRL Laboratories, LLC, Malibu, CA (US)

( * ) Notice: Subject to any disclaimer, the term of this patent is extended or adjusted under 35 U.S.C. 154(b) by 74 days.

(21) Appl. No.: 16/794,010

(22) Filed: Feb. 18, 2020

(65) Prior Publication Data

US 2020/0186348 A1 Jun. 11, 2020

Related U.S. Application Data

(63) Continuation-in-part of application No. 16/444,903, filed on Jun. 18, 2019, now Pat. No. 10,721,073, and
(Continued)

(51) Int. Cl.
*H04L 9/32* (2006.01)

(52) U.S. Cl.
CPC .......... *H04L 9/321* (2013.01); *H04L 2209/08* (2013.01); *H04L 2209/38* (2013.01)

(58) Field of Classification Search
CPC ....................................................... H04L 9/321
See application file for complete search history.

(56) References Cited

U.S. PATENT DOCUMENTS 9,635,000 B1 4/2017 Muftic
11,138,170 B2 10/2021 Crossley
(Continued)

FOREIGN PATENT DOCUMENTS

WO WO2018/007828 A2 1/2018
WO WO-2018007828 A2 * 1/2018 ........... H04L 9/3218
(Continued)

OTHER PUBLICATIONS

Pedersen T.P. (1992) Non-Interactive and Information-Theoretic Secure Verifiable Secret Sharing. In: Feigenbaum J. (eds) Advances in Cryptology—CRYPTO '91. CRYPTO 1991. Lecture Notes in Computer Science, vol. 576. Springer, Berlin, Heidelberg. (Year: 1992).*
Notification of Transmittal, the International Search Report, and the Written Opinion of the International Searching Authority for PCT/US2020/018685; dated Jun. 22, 2020.
Notification of Transmittal of International Search Report and the Written Opinion of the International Searching Authority for PCT/US2019/037790; dated Oct. 4, 2019.
International Search Report of the International Searching Authority for PCT/US2019/037790; dated Oct. 4, 2019.
Written Opinion of the International Searching Authority for PCT/US2019/037790; dated Oct. 4, 2019.
(Continued)

*Primary Examiner* — Kambiz Zand
*Assistant Examiner* — Phuc Pham
(74) *Attorney, Agent, or Firm* — Tope-McKay & Associates

(57) ABSTRACT

Described is a system for selective transparency in a public ledger. In operation, a first submission by a first entity is logged to the public ledger. The submission is a data entry with a message M and an identification number (ID). Separately, a linkage by a second entity is recorded. The linkage is an encryption and commitment linking the submission by the first entity to a second submission by the second entity. The linkage can be verified through a series of processes, such as by determining a value of linkage verification information. The value of the linkage verification information and corresponding block number is then transmitted to a third entity. The third entity reads the commitments from block $N_i$ and verifies that the commitments are commitments to the same ID using the linkage verification information.

3 Claims, 6 Drawing Sheets

Related U.S. Application Data a continuation-in-part of application No. 16/444,582, filed on Jun. 18, 2019.

(60) Provisional application No. 62/814,167, filed on Mar. 5, 2019, provisional application No. 62/801,581, filed on Feb. 5, 2019, provisional application No. 62/711,304, filed on Jul. 27, 2018, provisional application No. 62/711,355, filed on Jul. 27, 2018.

(56) References Cited

U.S. PATENT DOCUMENTS

| | | |
|---|---|---|
| 2002/0181709 A1 | 12/2002 | Sorimachi et al. |
| 2016/0044003 A1 | 2/2016 | Raykova et al. |
| 2016/0261409 A1 | 9/2016 | French |
| 2016/0330034 A1 | 11/2016 | Back |
| 2017/0070351 A1 | 3/2017 | Yan |
| 2017/0318360 A1 | 11/2017 | Tran |
| 2017/0338947 A1 | 11/2017 | Ateniese |
| 2017/0344983 A1 | 11/2017 | Muftic |
| 2018/0034810 A1 | 2/2018 | Pe'er et al. |
| 2018/0130130 A1 | 5/2018 | Dechu |
| 2018/0183587 A1 | 6/2018 | Won |
| 2018/0329964 A1 | 11/2018 | Tolani |
| 2018/0330077 A1 | 11/2018 | Gray |
| 2018/0330078 A1 | 11/2018 | Gray |
| 2018/0330079 A1 | 11/2018 | Gray |
| 2018/0330125 A1 | 11/2018 | Gray |
| 2018/0330343 A1 | 11/2018 | Gray |
| 2018/0331821 A1 | 11/2018 | Gray |
| 2018/0332011 A1 | 11/2018 | Gray |
| 2018/0359096 A1 | 12/2018 | Ford |
| 2018/0373776 A1 | 12/2018 | Madisetti |
| 2019/0034459 A1 | 1/2019 | Qiu |
| 2019/0034923 A1* | 1/2019 | Greco ............... G06Q 20/383 |
| 2019/0036711 A1 | 1/2019 | Qiu |
| 2019/0102758 A1 | 4/2019 | Wright |
| 2019/0146979 A1 | 5/2019 | Madisetti |
| 2019/0349426 A1 | 11/2019 | Smith |
| 2020/0005296 A1 | 1/2020 | Green |
| 2020/0057869 A1 | 2/2020 | Wilke |

FOREIGN PATENT DOCUMENTS

| | | |
|---|---|---|
| WO | WO2018100578 | 6/2018 |
| WO | WO2018100578 A1 | 6/2018 |
| WO | WO2018126077 | 7/2018 |

OTHER PUBLICATIONS

Damgård I., Nielsen J.B. (2007) Scalable and Unconditionally Secure Multiparty Computation. In: Menezes A. (eds) Advances in Cryptology—CRYPTO 2007. Lecture Notes in Computer Science, vol. 4622. Springer, Berlin, Heidelberg, pp. 572-590.

FIPS Pub 180-4, Federal Information Processing Standards Publication, Secure Hash Standard (SHS), Aug. 2015, pp. 1-31.

Internet Engineering Task Force, PKCS #1: RSA Cryptography Specifications Version 2.2, Oct. 2012, Sections 7 and 8.

Guy Zyskind, Oz Nathan, and Alex Pentland, "Enigma: Decentralized Computation Platform with Guaranteed Privacy," Cryptography and Security (cs.CR); Distributed, Parallel, and Cluster Computing (cs.DC), arXiv:1506.0347, 2015, pp. 1-14.

Satoshi Nakamoto, Vitalik Buterin, "A Next-Generation Smart Contract and Decentralized Application Platform" Ethereum White Paper, @inproceedings, pp. 1-36, 2015.

Notification of Transmittal of International Search Report and the Written Opinion of the International Searching Authority for PCT/US2019/037736; dated Oct. 4, 2019.

International Search Report of the International Searching Authority for PCT/US2019/037736; dated Oct. 4, 2019.

Written Opinion of the International Searching Authority for PCT/US2019/037736; dated Oct. 4, 2019.

Damgård I., Nielsen J.B. Scalable and Unconditionally Secure Multiparty Computation. In: Menezes A. (eds) Advances in Cryptology—CRYPTO 2007. Lecture Notes in Computer Science, vol. 4622. Springer, Berlin, Heidelberg, pp. 572-590.

Aggrelos Kiayias, Alexander Russell, Bernardo David, and Roman Oliynykov. Outboros: A Provably Secure Proof-of-Stake Blockchain Protocol, Aug. 2017, pp. 357-388.

Ralph Merkle. Protocols for Public Key Cryptosystems. In Proceedings of the IEEE Symposium on Research in Security and Privacy, pp. 122-136, Apr. 1980.

Satoshi Nakamoto. "Bitcoin: A peer-to-peer electronic cash system," http://bitcoin.org/bitcoin.pdf, First published in 2008, downloaded Jun. 27, 2019.

Michele Ruta, Floriano Scioscia, Saverio Ieva, Giovanna Capurso, and Eugenio Di Sciascio, 2017 "Supply Chain Object Discovery with Semantic-enhanced Blockchain." In Proceedings of the 15th ACM Conference on Embedded Network Sensor Systems (SenSys '17), Rasit Eskicioglu (Ed.). ACM, New York, NY, USA, Article 60, pp. 1-2. DOI: https ://doi. org/10.1145/3131672.3136974.

T. Bocek, B. B. Rodrigues, T. Strasser and B. Stiller, "Blockchains everywhere—a use-case of blockchains in the pharma supply-chain," 2017 IFIP/IEEE Symposium on Integrated Network and Service Management (IM), Lisbon, 2017, pp. 772-777. doi: 10.23919/INM.2017.7987376.

S. Chen, R. Shi, Z. Ren, J. Yan, Y. Shi and J. Zhang, "A Blockchain-Based Supply Chain Quality Management Framework," 2017 IEEE 14th International Conference on e-Business Engineering (ICEBE), Shanghai, 2017, pp. 172-176. doi: 10.1109/ICEBE.2017.34.

Pedersen T.P. (1992) Non-Interactive and Information-Theoretic Secure Verifiable Secret Sharing. In: Feigenbaum J. (eds) Advances in Cryptology—CRYPTO '91. CRYPTO 1991. Lecture Notes in Computer Science, vol. 576. Springer, Berlin, Heidelberg, pp. 129-140.

FIPS Pub 180-4, Federal Information Processing Standards Publication, Secure Hash Standard (SHS), found at https: //nvlpubs.nist.gov/nistpubs/FIPS/NIST.FIPS.180-4.pdf, (Aug. 2015), pp. 1-36.

Notification of and the International Preliminary Report on Patentability Chapter II for PCT/US2019/037736; dated Sep. 24, 2020.

Notice of Allowance for U.S. Appl. No. 16/444,903, dated Mar. 27, 2020.

Search Query Report from I P.com (performed Mar. 19, 2020).

Office Action 1 for U.S. Appl. No. 16/444,582, dated Mar. 17, 2021.

Response to Office Action 1 for U.S. Appl. No. 16/444,582, dated Jun. 15, 2021.

Office Action 2 for U.S. Appl. No. 16/444,582, dated Jul. 27, 2021.

Notification of the International Preliminary Report on Patentability Chapter I for PCT/US2019/037790; dated Feb. 11, 2021.

The International Preliminary Report on Patentability Chapter I for PCT/US2019/037790; dated Feb. 11, 2021.

Response to Office Action 2 for U.S. Appl. No. 16/444,582, dated Oct. 27, 2021.

Office Action 3 for U.S. Appl. No. 16/444,582, dated Dec. 7, 2021.

Notification of the International Preliminary Report on Patentability Chapter I for PCT/US2020/018685; dated Sep. 16, 2021.

The International Preliminary Report on Patentability Chapter I for PCT/US2020/018685; dated Sep. 16, 2021.

* cited by examiner

304

308

SYSTEM AND METHOD FOR SELECTIVE TRANSPARENCY FOR PUBLIC LEDGERS

CROSS-REFERENCE TO RELATED APPLICATIONS

The present application is a Continuation-in-Part application of U.S. application Ser. No. 16/444,582, filed on Jun. 18, 2019, which is a non-provisional application of U.S. Provisional Application Nos. 62/801,581, filed on Feb. 5, 2019, AND 62/711,304, filed on Jul. 27, 2018, the entirety of which are incorporated herein by reference.

The present application is ALSO a Continuation-in-Part application of U.S. application Ser. No. 16/444,903, filed on Jun. 18, 2019, which is a non-provisional application of U.S. Provisional Application No. 62/711,355, filed on Jul. 27, 2018, the entirety of which are incorporated herein by reference.

The present application is ALSO a non-provisional patent application of U.S. Provisional Application No. 62/814,167, filed on Mar. 5, 2019, the entirety of which is hereby incorporated by reference.

BACKGROUND OF INVENTION

(1) Field of Invention

The present invention relates to a public ledger protocol and, more specifically, to a system implementing a protocol that provides for selective transparency for public ledgers.

(2) Description of Related Art

Blockchain protocols are generally used in transaction processes to reach consensus among parties and validate transactions within a blockchain network. There are numerous blockchain protocols in existence. Such protocols generally allow for highly distributed and auditable record keeping, but do not always provide a high level of privacy for the users. Such protocols are often implemented in supply chain management to allow the various parties to maintain a distributed supply chain record. For example, there are numerous previous publications on the application of blockchain to supply chain (see the List of Incorporated Literature References, Literature Reference Nos. 1-3).

In the supply chain example it is desirable to allow companies to be able to track the flow of parts in a supply chain in case a product recall is needed at some point in the future. However, suppliers to a manufacturer or other company will likely not want to publicize who their suppliers are, as this is sensitive information that could give their competitors an advantage. None of the existing protocols provide privacy guarantees as may be desired.

Thus, a continuing need exists for a system for selective transparency for public ledgers that implements a collection of protocols for creating linked data entries in a public ledger, such that an entity viewing the ledger cannot determine that the entries are linked unless it is given auxiliary information, or unless it has authorization to do so.

SUMMARY OF INVENTION

The present disclosure provides a system for selective transparency in a public ledger. In various embodiments, the system includes one or more processors and an associated one or more memories (associated being the memory from which a particular one or more processors executes instructions). Each of the one or more memories is a non-transitory computer-readable medium having executable instructions encoded thereon, such that upon execution of the instructions, the one or more processors perform several operations, such as logging a first submission by a first entity to the public ledger, the submission being a data entry with a message M and an identification number (ID); and recording a linkage by a second entity, the linkage being an encryption and commitment linking the submission by the first entity to a second submission by the second entity.

In another aspect, the one or more processors perform an operation of decrypting the linkage to provide a regulator a decrypted linkage entry.

In yet another aspect, the one or more processors perform an operation of verifying the linkage.

Additionally, the operation of logging the first submission further comprises operations of constructing the message M; constructing the commitment to an identification number (ID) corresponding to message M, the commitment being constructed based on randomness r; encrypting the ID and the randomness r; concatenating the message M, commitment, and encryption data into a data payload D; and logging the payload D into the public ledger as the first submission and providing the first entity with a block number of payload D along with values of message M, ID, and r.

Further, verifying the linkage further comprises operations of determining a value of linkage verification information; transmitting the value of the linkage verification information and corresponding block number to a third entity; and reading, by the third entity, the commitments from block $N_i$ and verifying that the commitments are commitments to the same ID using the linkage verification information.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
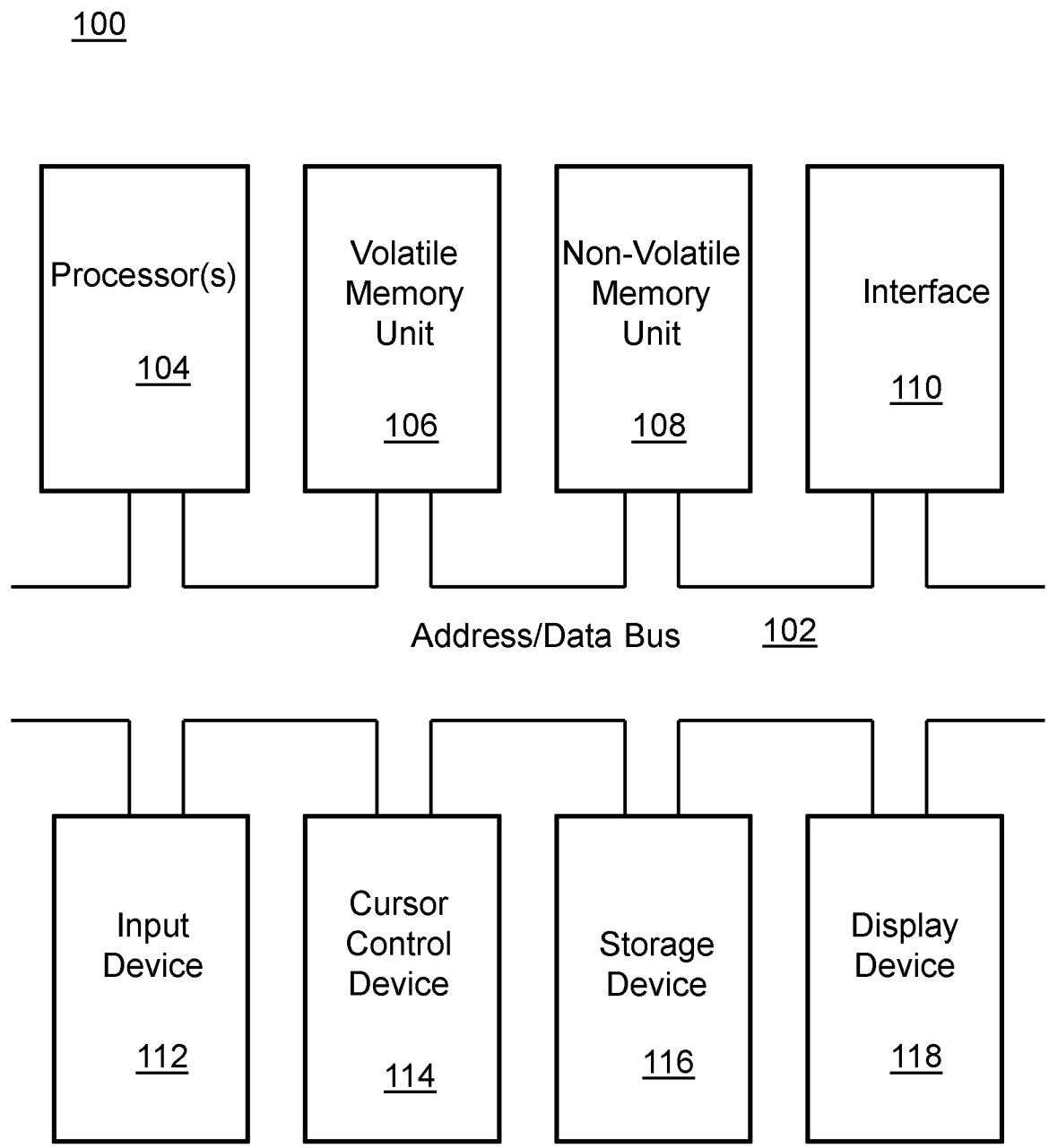
FIG. 1 is a block diagram depicting the components of a system according to various embodiments of the present invention.

The present invention relates to a public ledger protocol and, more specifically, to a system implementing a protocol that provides for selective transparency for public ledgers. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiments of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Michele Ruta, Floriano Scioscia, Saverio Ieva, Giovanna Capurso, and Eugenio Di Sciascio, 2017 "Supply Chain Object Discovery with Semantic-enhanced Blockchain." In Proceedings of the 15th ACM Conference on Embedded Network Sensor Systems (SenSys '17), Rasit Eskicioglu (Ed.). ACM, New York, N.Y., USA, Article 60, 2 pages. DOI: https://doi.org/10.1145/3131672.3136974.
2. T. Bocek, B. B. Rodrigues, T. Strasser and B. Stiller, "Blockchains everywhere—a use-case of blockchains in the pharma supply-chain," 2017 IFIP/IEEE Symposium on Integrated Network and Service Management (IM), Lisbon, 2017, pp. 772-777. doi: 10.23919/INM.2017.7987376
3. S. Chen, R. Shi, Z. Ren, J. Yan, Y. Shi and J. Zhang, "A Blockchain-Based Supply Chain Quality Management Framework," 2017 IEEE 14th International Conference on e-Business Engineering (ICEBE), Shanghai, 2017, pp. 172-176. doi: 10.1109/ICEBE.2017.34
4. Ethereum, open source platform for decentralized applications, found at www.ethereum.org, retrieved on Dec. 19, 2018.
5. Pedersen T. P. (1992) Non-Interactive and Information-Theoretic Secure Verifiable Secret Sharing. In: Feigenbaum J. (eds) Advances in Cryptology—CRYPTO '91. CRYPTO 1991. Lecture Notes in Computer Science, vol 576. Springer, Berlin, Heidelberg
6. FIPS PUB 180-4, Federal Information Processing Standards Publication, Secure Hash Standard (SHS), found at https://nvlpubs.nist.gov/nistpubs/FIPS/NIST.FIPS.180-4.pdf, (August 2015).

(2) PRINCIPAL ASPECTS

Various embodiments of the invention include three "principal" aspects. The first is a system for selective transparency of public ledgers. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units (associated one or more memories) and are executed by one or more processors of the computer system 100. The one or more processors can be on a single computing device or networked or otherwise spread out across multiple computing devices. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
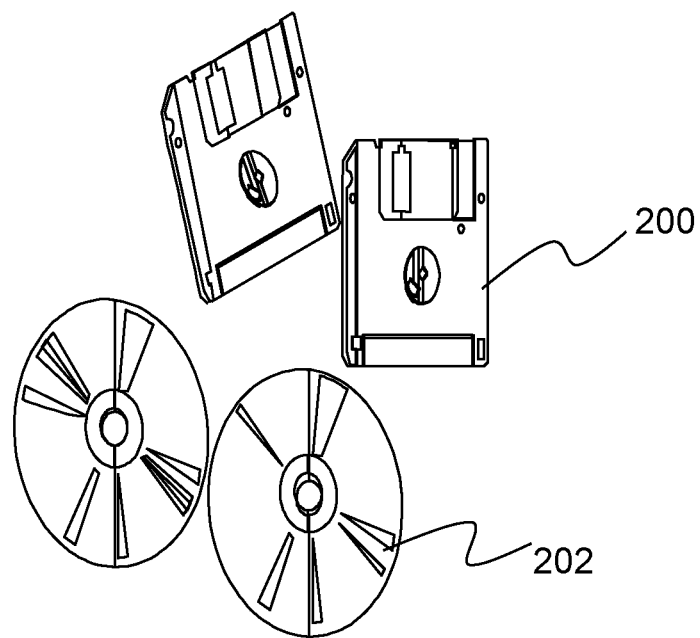
FIG. 2 is an illustration of a computer program product embodying an aspect of the present invention.

An illustrative diagram of a computer program product (i.e., storage device) embodying the present invention is depicted in FIG. 2. The computer program product is depicted as a floppy disk 200 or an optical disk 202 such as a CD or DVD. However, as mentioned previously, the computer program product generally represents computer-readable instructions stored on any compatible non-transitory computer-readable medium (each of with is a memory for use with an associated processor). The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, or a flash drive. In either event, the instructions are encoded on a non-transitory computer-readable medium.

(3) INTRODUCTION

This disclosure is directed to a system and method for selective transparency for public ledgers. This implements a collection of protocols for creating linked data entries in a public ledger, such that an entity viewing the ledger cannot determine that the entries are linked unless it is given auxiliary information, or unless it has authorization to do so. One example implementation is the submission of supply chain data to a public blockchain, in which entities along the blockchain can upload messages to the blockchain that link products they have produced with parts and/or materials used in creating that part, allowing supply chain traceability while preserving the privacy of the individual suppliers.

There are numerous blockchain protocols in existence. Such protocols generally allow for highly distributed and auditable record keeping, but do not always provide a high level of privacy for the users. The protocol of the present disclosure provides a combination of auditability and privacy that is well suited for the supply chain use case, allowing an authorized entity or entities to view all data on the blockchain, and allowing entities in the supply chain to prove provenance of their parts and materials to those to whom they give auxiliary information.

In the supply chain example it is desirable to allow companies to be able to track the flow of parts in a supply chain in case a product recall is needed at some point in the future. However, suppliers to a manufacturer or other company will likely not want to publicize who their suppliers are, as this is sensitive information that could give their competitors an advantage. The invention of this disclosure could be used to allow such suppliers to upload their provenance information in a highly private manner, allowing a regulator or relevant company to act as auditors with full access to all supply chain data.

(4) SPECIFIC DETAILS OF VARIOUS EMBODIMENTS

As noted above, the present disclosure is directed to a system implementing a protocol that provides for selective transparency for public ledgers. Thus, in one aspect, the system may be a public ledger implementing the process and protocols as described herein. As a non-limiting example, a blockchain such as Ethereum may be used as a public ledger (see Literature Reference No. 4). Each entity in the supply chain has the ability to upload data to the public ledger using a function pub(•). When an entity invokes pub(D), it receives a block number N as a return value, which is the number of the data block in which the data D was published, and we write N=pub(D). Note that although the system does not require the protocol to use a blockchain, it is still assumed that the data entries are published into discrete blocks.

Let $P_k$ denote an entity in the supply chain, and assume that $P_k$ has a publicly known public key. Let $\sigma_k(D)$ denote $P_k$'s signature on D. The regulator(s) have a private/public key pair (sk, pk). The public key pk is publicly known to all entities in the supply chain, but the private key sk is only known to the regulator(s). Let $Dec_{sk}(•)$ denote decryption with the private key, and let $Enc_{pk}(•)$ denote encryption with the public key. Assume the existence of a publicly known group G over which the discrete logarithm assumption holds. Let g be a generator of G and let $h=g^a$ be an element of G for some random integer a. Assume that g and h are publicly known, but that a is not known to any entity. Assume the existence of a publicly known hash function H whose output is an integer not greater than |G|. As a non-limiting example, SHA-256 may be used as a hash function (see Literature Reference No. 6). The elements g and h, along with the hash function H, will be used to form Pedersen commitments (see Literature Reference No. 5).

Figure 3:
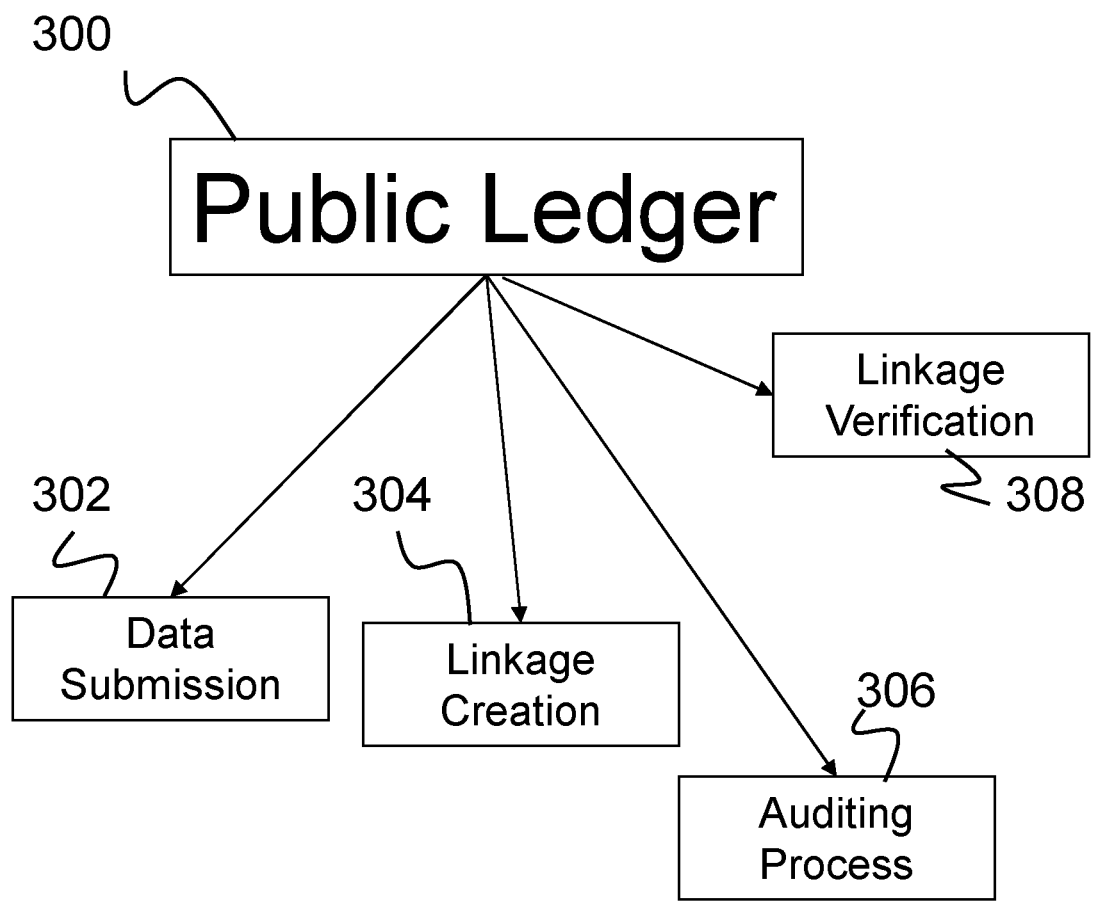
FIG. 3 is a block diagram depicting a public ledger and protocols according to various embodiments of the present invention.

Assuming the existence of a public ledger 300 (examples of which are provided above) and as shown in FIG. 3, the system allows for at least a data submission protocol 302, a linkage creation protocol 304, an auditing process protocol 306, and a linkage verification protocol 308.

(4.1) Data Submission Protocol 302

Figure 4:
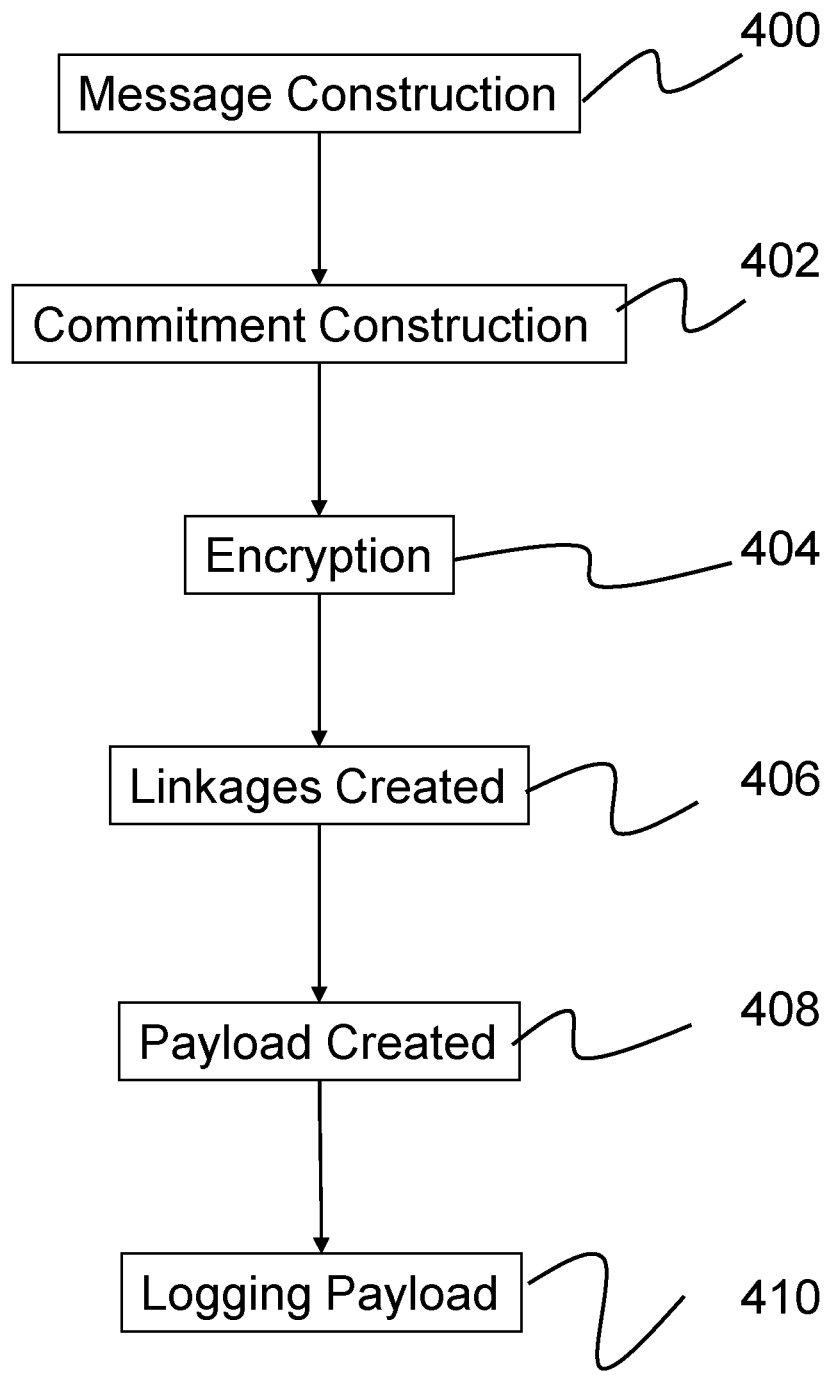
FIG. 4 is a block diagram depicting a data submission protocol according to various embodiments of the present invention.

In this protocol with the above listed assumptions as implemented in a public ledger, an entity $P_k$ submits a data entry with a message M and an identification number (ID) to the public ledger. As shown in FIG. 4, the data submission protocol 302 proceeds follows:

1. Message Construction 400: $P_k$ constructs a descriptive message M. In the supply chain use case, the message may be of the form, "$P_k$ has produced a part of type X."
2. Commitment Construction 402: $P_k$ constructs a Pedersen commitment to an ID number corresponding to the message. In the supply chain use case, this may be the ID number of the part, or a batch number of some raw material. The commitment is constructed by generating a random number r and then computing $g^{H(ID)}h^r$. The value $g^{H(ID)}h^r$ is the specific Pedersen commitment used in this protocol (although other commitments may be used depending on the specific implementation).
3. Encryption 404: $P_k$ constructs an encryption of the ID and the randomness used to construct the commitment using the public key pk, which is $Enc_{pk}(ID,r)$.
4. Linkages Created 406: $P_k$ may optionally construct linkage entries, thereby linking the created entry in the public ledger to previous entries. In the supply chain use case, an entity producing a product would want to provide linkage data to the IDs for parts used in the creation of that product, or the batch numbers of raw materials used in the creation of the product. If the entity is mining/collecting a raw material, then they might not include linkage data, as there would be no other entity further up in the supply chain. Indexing the linkage entries by i, the following is done for each linkage entry: $P_k$ retrieves the stored values $N_i$ and $ID_i$, which are the block number and identification number for that linkage entry, respectively. ($P_k$ will have received these values in the linkage creation protocol below.) $P_k$ then generates a random $r_i'$ and constructs the linkage entry $(g^{H(ID_i)}h^{r'}{}_i, Enc_{pk}(N_i, ID_i, r_i'))$.
5. Payload Created 408: $P_k$ concatenates the data constructed in the previous steps into a data payload D (i.e., the part of transmitted data that is the actual intended message). If there are n data linkage entries, this will be of the form $$D=M,g^{H(ID)}h^r,Enc_{pk}(ID,r),(g^{H(ID_1)}h^{r'1},Enc_{pk}(N_1,ID_1,r_1')),\ldots,(g^{H(ID_n)}h^{r'n},Enc_{pk}(N_n,ID_n,r_n'))$$

and if there are no data linkage entries, this will be of the form $$D=M,g^{H(ID)}h^r,Enc_{pk}(ID,r).$$

$P_k$ constructs a signature on the payload, $\sigma_k(D)$.

6. Logging Payload 410: $P_k$ invokes pub(D, $\sigma_k(D)$), and records the returned block number, along with the values M, ID, and r.

(4.2) Linkage Creation Protocol 304

Figure 5:
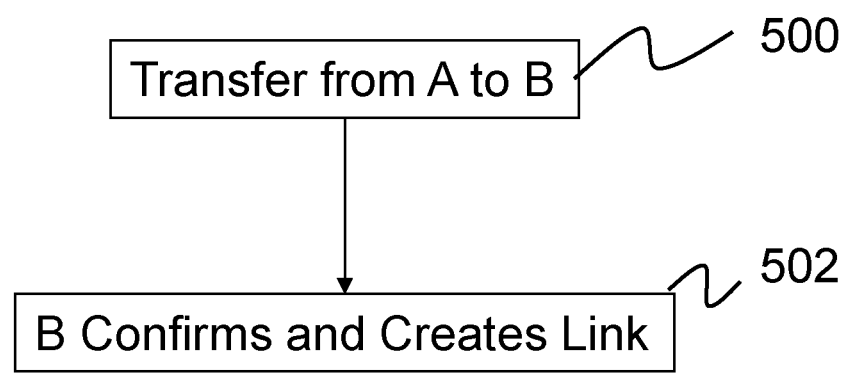
FIG. 5 is a block diagram depicting a linkage creation protocol according to various embodiments of the present invention.

In this protocol, entity A gives entity B sufficient information to create a data linkage entry to an initial entry created by A. The linkage entry would be created in future instances of the data submission protocol. In the context of this protocol, A has played the role of $P_k$ in some previous instance of the data submission protocol, and B may play the role of $P_k$ in some future instance of the data submission protocol. In the supply chain use case, this information transfer would occur in tandem with the transfer of a part or material from A to B, allowing B to link his part ID number back to A's part ID number. As shown in FIG. 5, the linkage creation protocol 304 proceeds as follows:

1. Transfer from A to B 500: Entity A passes the information N, ID, and r to entity B, where N, ID, and r were used by A in a previous instance of the data submission protocol.

2. B Confirms and Creates Link 502: Entity B looks up block N, computes $g^{H(ID)}h^r$ and confirms that this matches with the entry in block N.

(4.3) Auditing Process Protocol 306

If a regulator wants to determine the ID number for a particular data submission in the public ledger, the regulator can decrypt $Enc_{pk}(ID, r)$ by computing $Dec_{sk}(Enc_{pk}(ID, r))$ to obtain the decrypted linkage entry. The regulator is any party authorized to verify data in the ledger. The regulator can also decrypt the encrypted portion of any data linkage entries by computing $Dec_{sk}(Enc_{pk}(N_i, ID_i, r_i'))$. The regulator may then decrypt the entries in block $N_i$ to continue the auditing process.

In the supply chain use case, this process may take place when a regulator wants to determine the origin of parts and materials used in constructing a product. The regulator can look up the ID number of the part in the public ledger by decrypting values, and then determine the ID numbers of parts and materials used in constructing that part, continuing the investigation to see the origin of those parts and materials.

(4.4) Linkage Verification Protocol 308

Figure 6:
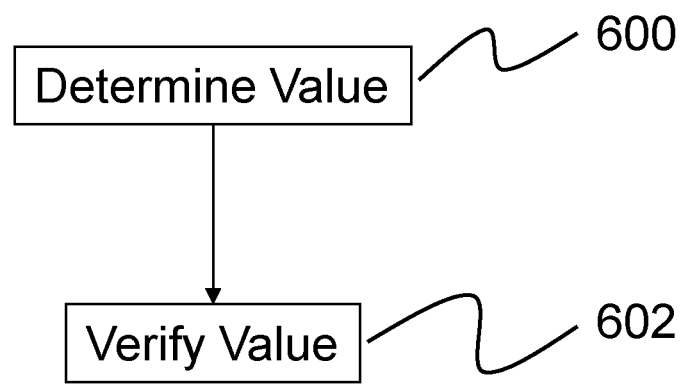
FIG. 6 is a block diagram depicting a linkage verification protocol according to various embodiments of the present invention.

Suppose that an entity $P_k$ wants to prove to some other entity V that a data linkage entry $(g^{H(ID_i)}h^{r'_i}, Enc_{pk}(N_i, ID_i, r_i'))$ posted by $P_k$ has the same $ID_i$ as the initial data submission $g^{H(ID_i)}h^{r_i}$ posted by some other party. Recall that $P_k$ knows both $r_i'$ and $r_i$, as $P_k$ generated $r_i'$ and retained a copy of $r_i$ that it learned during the linkage creation protocol. In this scenario and as shown in FIG. 6, the entity would initiate the linkage verification protocol 308, which proceeds as follows:

1. Determine Value 600: $P_k$ computes $h^{r_i-r'_i}$ and sends this value, along with $N_i$, to V. For example, since $P_k$ knows $r_i-r'_i$ and h, it can compute $h^{r_i-r'_i}$ using basic arithmetic over group G.
2. Verify Value 602: Then V reads $u=g^{H(ID_i)}h^{r_i}$ from block $N_i$ and $v=g^{H(ID_i)}h^{r'_i}$ and verifies that $uv^{-1}=h^{r_i-r'_i}$.

(4.5) Practical Applications

As can be appreciated by those skilled in the art, the process described herein can be used for data verification between parties or ledgers. Further, the process can be used in a variety of other applications. As a non-limiting example, some of the processes could be automated. For instance, for the data submission protocol, a factory worker could scan barcodes of component pieces and the barcode of the final product created using those pieces (which could be done using a portable device or cell phone), and the device could then automatically send the relevant data to a factory server, which could then publish the relevant information to the blockchain.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for selective transparency in a supply chain record, the system comprising:
    one or more processors and associated one or more memories, each of the one or more memories being a non-transitory computer-readable medium having executable instructions encoded thereon, such that upon execution of the instructions, the one or more processors perform operations of:
        submitting a data entry by a first entity creating a product in a supply chain to the public supply chain record in a private manner by performing operations of:
            constructing, by the first entity, a data entry with a message M, wherein the message M is related to a part of the product in the supply chain;
            constructing, by the first entity, a Pedersen commitment to an initial identification (ID) corresponding to the message M, wherein the ID is an ID for the part, the Pedersen commitment being constructed based on a first randomness r;
            encrypting, by the first entity, the initial ID and the first randomness r using a public key known to all entities in the supply chain;
            creating, by the first entity, an initial linkage entry linking the data entry to one or more previous data entries in the public supply chain record, wherein the initial linkage entry links IDs for parts used in creation of the product, wherein creating the linkage entry comprises:
                generating values corresponding to a block number and an identification number;
                generating, by the first entity, a second randomness r';
                encrypting the block number, the identification number, and the second randomness r',
                wherein the initial linkage entry comprises the Pedersen commitment and the encrypted block number, identification number, and second randomness r';
            concatenating, by the first entity, the message M, the Pederson commitment, the encrypted ID, the encrypted randomness r, and the linkage entry into a data payload D;
            constructing a signature on the data payload D; and
            logging the data payload D into the public supply chain record as a first submission and providing the first entity with a block number of payload D along with values of message M, ID, and r;
        creating, by a second entity, a linkage to the initial ID, the linkage being an encryption and commitment linking the submission by the first entity to a second submission by the second entity;
        decrypting the linkage to provide a regulator a decrypted linkage entry; and
        verifying the linkage by performing operations of:
            determining a value of linkage verification information;
            transmitting the value of the linkage verification information and corresponding block number to a third entity without revealing the ID committed to;
            reading, by the third entity, commitments from block $N_i$ and verifying that the commitments are commitments to the same ID using the linkage verification information, where $N_i$ is a block number indexed by i.

2. A computer program product for selective transparency in a supply chain record, the computer program product comprising:
a non-transitory computer-readable medium having executable instructions encoded thereon, such that upon execution of the instructions by one or more processors, the one or more processors perform operations of:
submitting a data entry by a first entity creating a product in a supply chain to the public supply chain record in a private manner by performing operations of:
constructing, by the first entity, a data entry with a message M, wherein the message M is related to a part of the product in the supply chain;
constructing, by the first entity, a Pedersen commitment to an initial identification (ID) corresponding to the message M, wherein the ID is an ID for the part, the Pedersen commitment being constructed based on a first randomness r;
encrypting, by the first entity, the initial ID and the first randomness r using a public key known to all entities in the supply chain;
creating, by the first entity, an initial linkage entry linking the data entry to one or more previous data entries in the public supply chain record, wherein the initial linkage entry links IDs for parts used in creation of the product, wherein creating the linkage entry comprises:
generating values corresponding to a block number and an identification number;
generating, by the first entity, a second randomness r';
encrypting the block number, the identification number, and the second randomness r',
wherein the initial linkage entry comprises the Pedersen commitment and the encrypted block number, identification number, and second randomness r';
concatenating, by the first entity, the message M, the Pederson commitment, the encrypted ID, the encrypted randomness r, and the linkage entry into a data payload D;
constructing a signature on the data payload D; and
logging the data payload D into the public supply chain record as a first submission and providing the first entity with a block number of payload D along with values of message M, ID, and r;
creating, by a second entity, a linkage to the initial ID, the linkage being an encryption and commitment linking the submission by the first entity to a second submission by the second entity;
decrypting the linkage to provide a regulator a decrypted linkage entry; and
verifying the linkage by performing operations of:
determining a value of linkage verification information;
transmitting the value of the linkage verification information and corresponding block number to a third entity without revealing the ID committed to;
reading, by the third entity, commitments from block $N_i$ and verifying that the commitments are commitments to the same ID using the linkage verification information, where $N_i$ is a block number indexed by i.

3. A computer implemented method for selective transparency in a supply chain record, the method comprising an act of:
causing one or more processors to execute instructions encoded on an associated non-transitory computer-readable medium, such that upon execution, the one or more processors perform operations of:
submitting a data entry by a first entity creating a product in a supply chain to the public supply chain record in a private manner by performing operations of:
constructing, by the first entity, a data entry with a message M, wherein the message M is related to a part of the product in the supply chain;
constructing, by the first entity, a Pedersen commitment to an initial identification (ID) corresponding to the message M, wherein the ID is an ID for the part, the Pedersen commitment being constructed based on a first randomness r;
encrypting, by the first entity, the initial ID and the first randomness r using a public key known to all entities in the supply chain;
creating, by the first entity, an initial linkage entry linking the data entry to one or more previous data entries in the public supply chain record, wherein the initial linkage entry links IDs for parts used in creation of the product, wherein creating the linkage entry comprises:
generating values corresponding to a block number and an identification number;
generating, by the first entity, a second randomness r';
encrypting the block number, the identification number, and the second randomness r',
wherein the initial linkage entry comprises the Pedersen commitment and the encrypted block number, identification number, and second randomness r';
concatenating, by the first entity, the message M, the Pederson commitment, the encrypted ID, the encrypted randomness r, and the linkage entry into a data payload D;
constructing a signature on the data payload D; and
logging the data payload D into the public supply chain record as a first submission and providing the first entity with a block number of payload D along with values of message M, ID, and r;
creating, by a second entity, a linkage to the initial ID, the linkage being an encryption and commitment linking the submission by the first entity to a second submission by the second entity;
decrypting the linkage to provide a regulator a decrypted linkage entry; and
verifying the linkage by performing operations of:
determining a value of linkage verification information;
transmitting the value of the linkage verification information and corresponding block number to a third entity without revealing the ID committed to;
reading, by the third entity, commitments from block $N_i$ and verifying that the commitments are commitments to the same ID using the linkage verification information, where $N_i$ is a block number indexed by i.

* * * * *